April 5, 1960   J. T. GONDEK   2,931,673
PRESSURE SEAL

Filed Nov. 25, 1955   3 Sheets-Sheet 1

INVENTOR
John T. Gondek
BY Robert M. Running
ATTORNEY

April 5, 1960

J. T. GONDEK 2,931,673

PRESSURE SEAL

Filed Nov. 25, 1955

INVENTOR
John T. Gondek

BY Robert M. Dunning
ATTORNEY

April 5, 1960     J. T. GONDEK     2,931,673
PRESSURE SEAL

Filed Nov. 25, 1955     3 Sheets-Sheet 3

INVENTOR
John T. Gondek

BY Robert M. Dunning

ATTORNEY

United States Patent Office 2,931,673
Patented Apr. 5, 1960

2,931,673

PRESSURE SEAL

John T. Gondek, Minneapolis, Minn.

Application November 25, 1955, Serial No. 548,831

4 Claims. (Cl. 286—26)

This invention relates to an improvement in pressure seals and deals particularly with a flexible type of seal which is capable of being used with high pressure, and relatively high temperatures.

Various types of members have been produced which are designed to provide an effective seal between two cylindrical relatively movable members. For example, in sealing hydraulic pistons against their cylinders, flexible resilient seals of rubber commonly known as "O-ring" have been employed. In many instances these O-rings provide effective seals between the relatively slidable and rotatable members. They are inserted in a groove in one of the members and are proportioned to bear against the other of the members to provide an effective sealing means. However, when the seals are subjected to high pressures, they have a tendency to extrude into the space between the cylinder and the piston. This fact has been recognized by the manufacturer of these seals and as a result it has been proposed to provide flexible leather washers on either side of the O-ring in the O-ring groove to prevent extrusion of the rubber or other resilient material forming the O-ring. These anti-extrusion backup washers have some advantages within certain pressure ranges. However, these rings are subject to wear and deterioration and do not positively prevent extrusion when the seals are subjected to a high pressure.

An object of the present invention resides in the provision of a seal which is formed of two or more sealing members, one of which comprises a resilient sealing member constructed of rubber or some similar material and the other of which comprises a wear-resistant material which is relatively much less elastic but which may be urged against the surfaces to be sealed by the resilient member and the fluid pressure. With such an arrangement a long lasting seal is provided which does not readily extrude and which will last considerably longer than seals of various other types. A further feature of the present invention lies in the provision of a seal having a very low break out and sliding friction. This results in a lowering of the temperature at which the rings operate, thereby prolonging the seal life. The structure is also designed to have a long life when used against a relatively rough movable part.

An object of the present invention resides in the provision of a seal between two relatively movable and generally cylindrical members such as a piston and a cylinder in which one of the relatively movable parts is provided with a groove to accommodate the seal. The seal includes at least two parts, one of which forms the wearing member of the seal and is designed to project from the groove sufficiently to contact the other member. The second sealing member forms a resilient compressible member which is interposed between the base of the groove and the first sealing member so as to urge the first sealing member into sealing contact with the surface of the relatively movable member and to act as a seal between relatively moving members and the groove. As a result of this construction the extrusion of the relatively soft resilient material is prevented as this member is not in position to be extruded between the movable parts. The member which is subject to wear may be of a hard plastic material such as "Teflon" or laminated "thenolic" resins which are impregnated with a lubricant material and which provide an effective seal with a minimum of wear. The wearing portions of the seal may also be of soft bearing metals such as copper alloy, plated low carbon steel, aluminum alloy or other relatively soft metal which can be pressed against the relatively movable member by the expansion of the resilient sealing member.

A feature of the present invention lies in the fact that the seal is extremely effective against wear and extrusion particularly where there are grooves, ports, or irregularities in the surface of the relatively movable member against which the seal must bear. For example, a valve is disclosed with radially spaced external grooves or ports which are designed to permit the flow of fluid between the valve ports. Seals of the O-ring type are ineffective in such an environment and as pressure causes the relatively soft material of the O-ring to press down into the grooves, damaging the O-ring upon relative movement of the relatively movable member. This wear and cutting can be largely eliminated with the seals which form a part of the present invention.

These and other objects and novel features of the present invention will be more clearly and fully set forth in the following specification and claims.

In the drawings forming a part of the specification:

Figure 7:
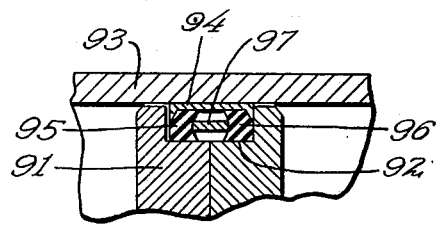

Figure 7 also shows a section through a portion of a high pressure piston showing an additional modification of my construction.

Figure 8:
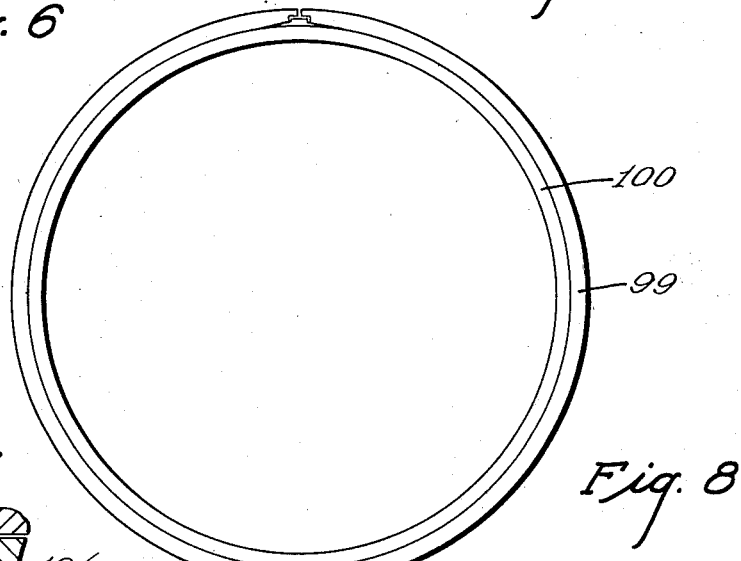

Figure 8 is a plan view of a piston ring type seal showing the general construction thereof.

Figure 9:
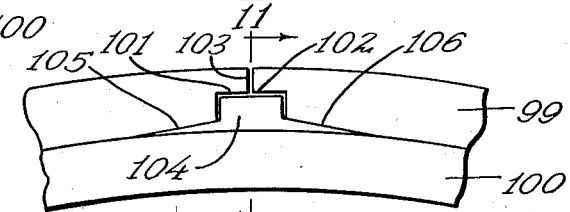

Figure 9 is an enlarged view of a portion of the seal shown in Figure 8, showing the piston ring joint in detail.

Figure 10:
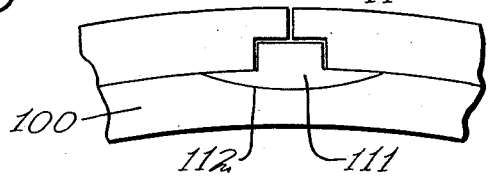

Figure 10 is a view similar to Figure 9 showing another modification of piston ring joint.

Figure 11:
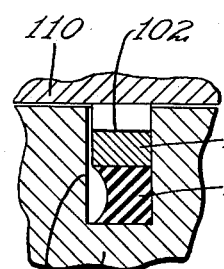

Figure 11 is a sectional view through the seal shown in Figure 10.

Figure 12:
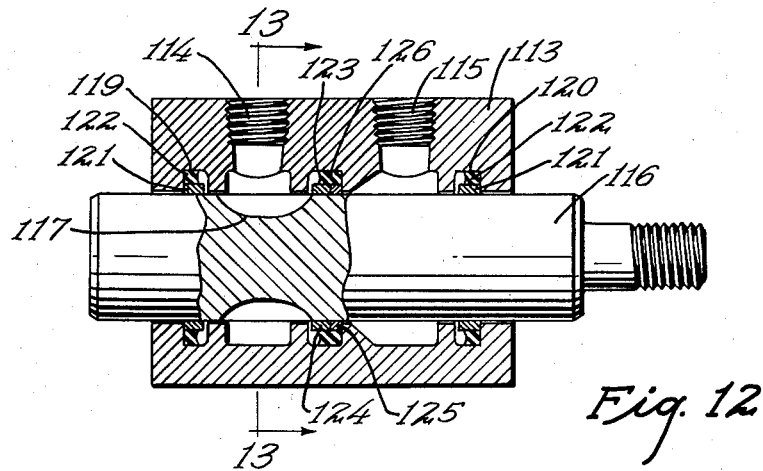

Figure 12 is a sectional view through a valve construction showing diagrammatically certain seals used in conjunction therewith.

Figure 13:
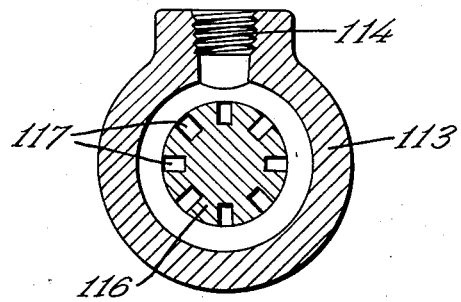

Figure 13 is a cross sectional view through the valve, the position of the section being indicated by the line 13—13 of Figure 12.

Figure 14:
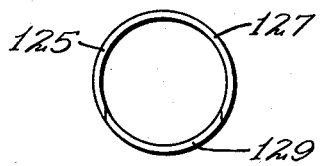

Figure 14 is a side elevational view of one type of ring which can be used with the valve construction illustrated in Figure 13.

Figure 15:
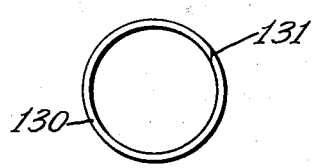

Figure 15 is a side elevational view of a more conventional type of split piston ring which may be used with valves of the type having grooves in the movable members thereof.

In view of the fact that there are numerous variations in the specific form of the seal, I have shown a number of views which are typical of such constructions. For example, Figure 1 of the drawings illustrates three slightly different forms of seals all of which have certain features in common. For example, all of the seals illustrated are constructed in a manner to avoid the extrusion of the seals under normal high pressures which they may experience.

Figure 1:
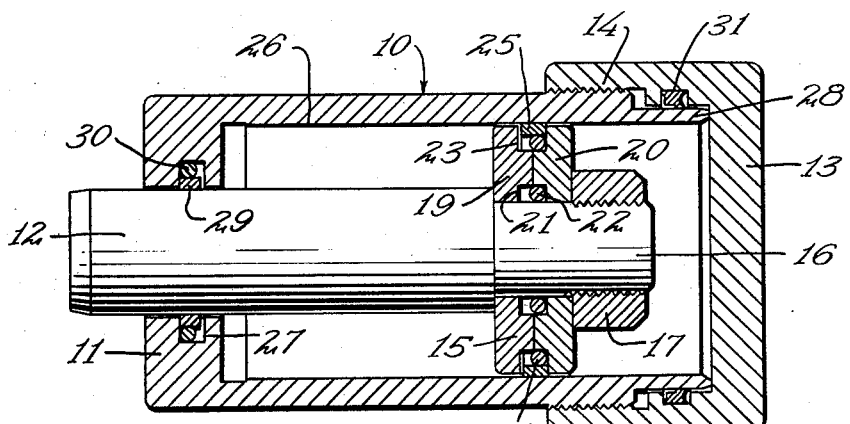
Figure 1 is a diagrammatic sectional view through a cylinder and piston showing seals incorporated therein.

Figure 1 illustrates a cylinder 10 having an end closure 11 at one end thereof through which the piston rod 12 slideably extends. An end cap 13 having an internally threaded peripheral flange 14 is threaded onto the open end of the cylinder 10 to form a closure therefor. The piston, which is illustrated in general by the numeral 15, is mounted upon the piston rod 12 within the interior of the cylinder 10. The piston rod 12 is provided with an externally threaded relatively smaller diameter extremity 16 designed to accommodate a nut 17 which holds the piston 15 in place upon the piston rod.

There are three types of seals of a non-conventional type embodied in Figure 1 of the drawings. The piston 15 is provided with a pair of discs 19 and 20 which are held together by the nut 17. A groove 21 is provided in the internal bore of the piston discs 19 and 20 and the juncture between these discs. An O-ring 22 of conventional type is mounted in a groove 21 and acts as a seal to prevent the leakage of fluid between the piston and the piston rod. In view of the fact that these parts do not move relatively once assembled and may be produced with a close running fit, a conventional O-ring forms an effective seal at this point.

An external sealing groove 23 is provided between the piston discs 19 and 20 in the external surface thereof. An O-ring 24 is mounted in this groove 23 adjoining the base of the groove. The O-ring and the groove are properly proportioned to accommodate a hollow cylindrical sealing ring 25 outwardly of the O-ring. This ring 25 is preferably made of material such as Teflon or another relatively stiffer plastic material such as lubricant impregnated molded phenolic resins. The ring 25 is of proper exterior diameter to normally engage snugly against the interior surface 26 of the cylinder 10. The piston discs 20 and 19 may fit rather freely in the cylinder so that fluid under pressure on one side or the other of the piston may be transmitted into the ring groove 23.

With this type of arrangement, pressure from the high pressure side of the piston is transmitted into the ring groove 23, the ring 25 being urged against the opposite side of the piston groove from the pressure side of the piston. The pressure of the fluid in the ring groove tends to expand the O-ring in the groove causing it to press outwardly against the ring 25 in a manner to force this ring against the exterior surface of the ring and the interior surface of the cylinder. The relatively resilient ring 24 also forms an effective seal between the ring 25 and the walls of the groove 23 to prevent leakage of the fluid past these combined rings.

This arrangement has certain decided advantages over conventional construction. The outer ring 25 being made of material which is relatively nonresilient as compared to rubber or the like will not extrude into the space between the pistons and the cylinder wall if the structure is used for normal high pressures. At the same time, the O-ring serves as an effective seal not only by expanding the outer ring 25 but also to seal against the piston groove to prevent the leakage of fluid about the outer ring 25. If desired, the two rings, one of relatively hard material and the other relatively soft, can be bonded together. This is also true of various others of the forms to be described, where relative movement of the rings is not essential or important. The rings of harder material are usually dimensioned to provide an interference fit against the relatively movable part. The O-rings help hold this harder ring in contact with the part engaged despite dimensional changes due to pressure and temperature.

At the left hand end of the cylinder 10 in Figure 1 of the drawings, I disclosed a seal which is substantially similar to that previously described but the reverse thereof. In this arrangement the groove in which the seal is located is in the inner surface of the cylinder and the seal engages against the piston rod 12. The groove in the end 11 of the cylinder 10 is indicated by the numeral 27. A hollow cylindrical ring 29 which may be of various materials but which is preferably material such as a hard plastic such as Teflon or molded phenolic resin laminated and impregnated with a suitable lubricant encircles the piston rod 12 and is of proper internal diameter to normally engage against the outer surface of the piston rod 12. An O-ring 30 is positioned in the groove 27 externally of the ring 29. This O-ring 30 is of flexible resilient material such as rubber or similar material which may flex or expand to some extent when subjected to fluid pressure. When fluid under pressure is exerted between the piston rod 12 and the cylinder end 11, this pressure enters the groove 27 and exerts its force against the relatively soft ring 30 tending to expand this ring. Expansion of the ring 30 not only tends to urge the inner ring 29 against the outer surface of the piston rod 12 but also serves as an effective seal to prevent the escape of fluid past the ring 29.

In view of the fact that fluid can also escape from the cylinder above the joint between the end cap 13 and body of the cylinder, the wall of the cylinder 10 is extended past the threads connecting the body of the cylinder to the cap 13 and an internal groove 31 is provided in the inner surface of this cap. The portion of the cap containing the groove 31 encircles the extending end 28 of the cylinder body.

Figure 2:
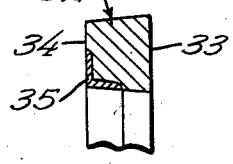
Figure 2 is a cross sectional view of one of the seals illustrated in Figure 1 of the drawings.

This type of ring is best illustrated in detail in Figure 2 of the drawings. The ring comprises a body which is four-sided in cross section with one side 33 of the ring 32 somewhat wider than the other side 34 thereof. The side 33 of the ring is the side which is normally subjected to fluid under pressure tending to leak from the cylinder.

A light weight ring 35 of metal or similar material forms a reinforcement between the inner surface of the ring 32 and the side 34 thereof. This ring 35 is angular in cross section and may be formed of copper, relatively hard plastic, or other material which will not extrude past the ring groove 31 under normal high pressures. At the same time, this ring 35 is sufficiently flexible so that the ring can be distorted sufficiently to engage the same in the groove 31. Alternatively, the cap body may be divided to accommodate the ring 32 between the split sides thereof.

When pressure is exerted against the wider side 33 of the ring 32, the flexible material of the ring is pressed into close contact with the walls of the groove forming a tight seal thereagainst. The external corner of the ring which could normally be extruded between the cap and the cylinder body by high pressures is reinforced by the ring 35 and therefore cannot extrude. As a result, an effective seal is provided without the chance of extrusion usually experienced with constructions of this type.

Figure 3:
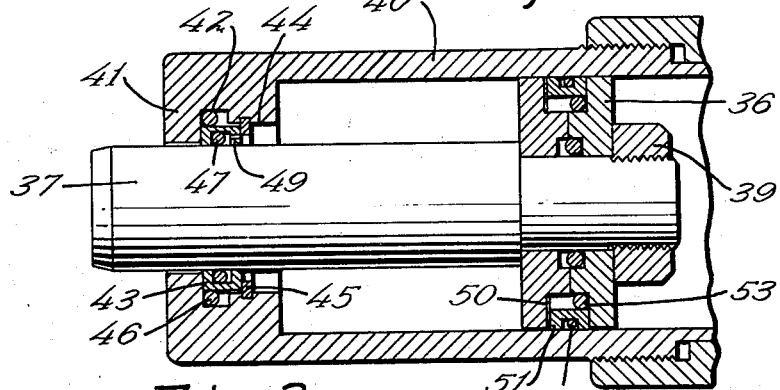
Figure 3 shows a sectional view similar to Figure 1 but embodying slightly different forms of pressure seals.

Figure 3 of the drawings shows a similar cylinder embodying a piston and having seals encircling the piston rod and also about the periphery of the piston itself. In this view, the piston is indicated in general by the numeral 36 and is connected to the piston rod 37 by the nut 39 or by other suitable means. The piston 36 is designed to slide within the cylinder 40 having a closed end 41 through which the piston rod 37 extends. An internal groove 42 is provided in the bore connecting the interior and exterior cylinder and through which the piston rod 37 extends. This bore is equipped with a channel shaped ring 43 of soft metal or other material which is slidable into one end of the bore 44 through the closed end 41 of the piston and which is held in place by a snap ring 45 or by other suitable means. The bore 44 is accordingly of proper diameter to accommodate the ring 43 while the groove 42 extends outwardly from the larger diameter portion of the bore 44.

An O-ring 46 is positioned in the groove 42 exteriorally of the channel shaped ring 43. A second O-ring 47 of somewhat smaller diameter is located between the sides of the channel shaped ring 43. The channel shaped ring is arranged with the base of the ring outwardly and the parallel side flanges of the channel shaped structure extending inwardly toward the piston rod 37.

As is indicated in this figure of the drawings, passages such as 49 may extend through the inner side of the channel shaped ring 43 to communicate fluid under pressure to the interior of this ring causing pressure to be exerted against the O-ring 47. The channel shaped ring 43 is somewhat resilient in nature and as a result this ring is pressed inwardly firmly against the surface of the piston rod 37 by the outer O-ring 46 located in the groove 42. Thus an effective seal is provided both inwardly and outwardly of the channel shaped ring 43.

The reverse of this arrangement is illustrated in the piston 36. The piston 36 is provided with an external groove 50 designed to accommodate a ring 51 which is channel shaped in cross section. In this arrangement, the base of the channel is directed inwardly and the parallel flanges of the channel are directed outwardly against the inner walls of the cylinder 40. An O-ring 52 is provided between the sides of the channel shaped ring 51 and a second O-ring 53 is provided in the groove 50 inwardly of the channel shaped ring 51. Leakage of fluid past one side of the piston 36 tends to expand the O-ring 53 causing the channel shaped ring 51 to be urged firmly against the wall of the cylinder 40 and also forming an effective seal for the inner side of the ring 51. In a similar manner, the O-ring 52 is expanded to form a seal against the cylinder wall. As the ring 51 is made to fit closely against the cylinder wall and is held in this position by the O-ring 53 when the structure is under pressure an effective seal is provided. The metal ring 51 expands with the cylinder wall and as a result no clearance is provided between the metal ring and the cylinder wall for the O-ring to extrude through even at very high pressures.

Figure 4:
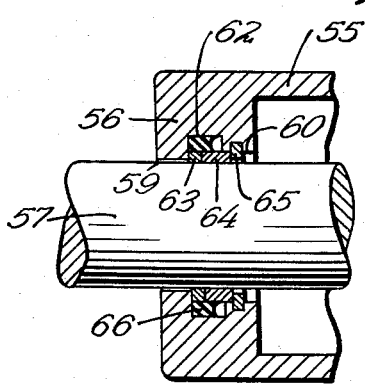
Figure 4 illustrates another modification of the sealing construction shown in Figures 1 and 3.

In Figure 4 another modification of the same type of seal is illustrated. The seal shown is designed to be substituted for the seal used between the piston rod and the cylinder end in the previous constructions and is designed to accommodate considerably higher pressures than the constructions shown in Figure 3. Figure 4 indicates diagrammatically a cylinder 55 having an end closure 56 through which the piston rod 57 extends. The purpose of the construction is to form a seal between the cylinder end 56 and the piston rod 57.

The outer portion 59 of the bore through which the piston rod extends fits relatively snugly about the piston rod. However the inner end of the bore as indicated at 60 is of larger diameter and is spaced from the piston rod 57. The outwardly extending groove 62 is provided in the cylinder end 56 between the ends of the bore described.

The seal illustrated in Figure 4 includes a cylindrical ring 63 of soft metal or the like, the ring preferably being formed of lead, copper alloy, bronze, aluminum alloy, or plated soft carbon steel. A second ring 64 is arranged in side-by-side relation with the ring 63 and is of proper external diameter to fit through the bore 60. The rings 63 and 64 are held in place by a snap ring 65. A flexible resilient ring 66 which is preferably rectangular in cross section is provided in the groove 62 externally of the rings 63 and 64.

The pressure from inside the cylinder 55 is free to pass through the portion 60 of the bore past the snap ring 65 and against the plastic ring 64. This pressure also passes the ring 64 and enters the groove 62 tending to expand the relatively resilient ring 66. As a result, the rings 63 and 64 are firmly pressed against the surface of the piston rod 57 and as the interior of the ring 63 fits closely about the piston rod 57 and as the more resilient ring 64 is pressed against the surface of the rod by the ring 66, no leakage can take place through the seal. The ring 63, being of smaller diameter than the bore portion 59, prevents any possible extrusion of the plastic ring 64. While rings of this type will not extrude under high pressures normally experienced in cylinders of this type, they can extrude under extremely high pressures and this action is prevented by the ring 63.

Figure 5:
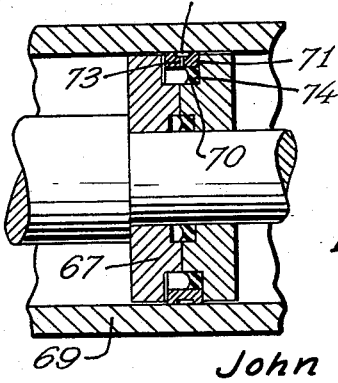
Figure 5 is a sectional view through a portion of a modified form of piston showing a somewhat different form of seal.

Figure 5 shows a slightly modified form of construction used to seal the piston 67 in its engagement with the cylinder wall 69. As the details of the piston are identical to those of previous constructions, these details will not be outlined. It is believed sufficient to state that the piston 67 is provided with an external groove 70 extending thereabout designed to accommodate the seal.

In the construction illustrated the seal includes an outer ring 71 which is formed of laminated phenolic resin, Teflon, or other material including metals. The ring 71 is channel shaped in cross section and is provided with an external groove 72 between its ends, this groove being communicated with the interior of the ring by radial passages such as 73.

A flexible ring 74 which is preferably rectangular in cross section is mounted in the groove 70 interiorally of the ring 71. When the piston is moving in one direction, this relatively flexible and resilient sealing ring 74 will be in one direction, and when the piston is travelling in the opposite direction, the sealing ring 74 will be in the opposite position. For example, in the particular arrangement illustrated, the piston 67 is moving to the left and pressure is being exerted upon the left side of ring 74 tending to expand the right end of the outer ring 71 against the inner wall of the cylinder 69.

With this arrangement, a certain amount of pressure can leak around the left hand end of the piston 67 and into the groove 70. This pressure is exerted outwardly against the outer ring 71 due to the expansion of the resilient ring 74. The left hand side of the ring 71 will not expand to the same extent as the opposite end due to the fact that this fluid under pressure can extend through the passage 73 and into the external groove 72 on the ring providing an external pressure which partially overcomes the outward force of the pressure. Thus in this type of construction the right hand end of the ring 71 is dependent upon the seal when the piston 67 is moving to the left, and the left hand end of the ring 71 is dependent upon to provide the seal when the piston is moving to the right, as in this construction the expandable ring 74 will shift laterally to expand against the left side of the ring 71. As the cylinder wall expands, the ring likewise expands, keeping the seal as the pressure increases.

Figure 6:
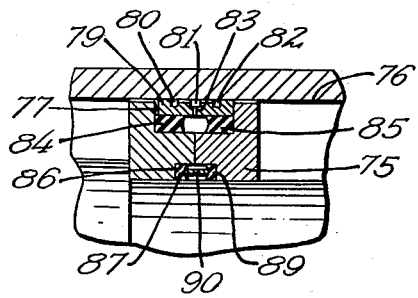
Figure 6 is a view similar to Figure 5 showing still another form of seal.

In Figure 6 of the drawings another similar construction is illustrated which varies but slightly from that illustrated in Figure 5. Figure 6 illustrates a piston 75 which is designed to engage against the inner surface 76 of a cylinder. The piston includes an external groove 77 which is designed to accommodate a ring of relatively harder material than O-rings or the like, this ring being indicated in general by the numeral 79 and having a plurality of external grooves 80, 81 and 82 in the outer surface thereof. These external grooves are connected by transversely extending grooves 83 so that the pressure in one groove can be communicated to the pressure in the other.

In this particular form of construction, a pair of generally rectangular rings 84 and 85 of rubber or other suitable flexible expandable material are positioned in the groove in spaced relation behind the ring 79. Passages 83 extend from the central groove 81 to the interior of the ring so that pressure from externally of the groove may be transmitted into the ring groove. As a result, any fluid leaking past a portion of the ring 79 and entering any of the grooves 80, 81 and 82 will be transmitted to the interior of the ring groove between the rubber rings 84 and 85. This pressure acts to expand the rings 84 and 85 and therefore to force the outer ring 79 against the wall 76 of the cylinder. The expansion takes place at the outer edges of the ring 79 due to the location of the rings 84 and 85.

In this particular form of construction, the internal groove 86 of the piston is provided with spaced relatively resilient rings 87 and 89 which are held in spaced relation by a spacing member 90. This seal takes the place of the regular O-ring seal which has been previously described.

The piston seal can also take the form illustrated in Figure 7 of the drawings. This view also indicates in general a piston 91 having an exterior groove 92 therein and which is slidable in a cylinder 93. A generally channel shaped thin metallic or plastic ring 94 is arranged so that the base of the ring is designed to extend against the inner surface of the cylinder 93. A pair of flexible resilient rings of rubber or the like indicated at 95 and 96 are provided in the ring groove 92 and are held in spaced relation by the spacer 97. The leakage past the piston tends to force the rings 95 and 96 toward the opposite end of the groove 92 from that in which pressure is applied. However, the spacer 97 prevents the movement of these rings and they accordingly expand to apply a necessary pressure against the outer ring 94.

Figures 8, 9, 10 and 11 of the drawings illustrate the manner in which the principle can be applied to piston rings which may be of the type used in internal combustion engines and the like. The numeral 99 indicates a split piston ring while the numeral 100 indicates a flexible resilient ring of silicone rubber or the like which is capable of resisting the heat normally produced in internal combustion engines and the like.

As is indicated in Figure 9 of the drawings, the piston ring 99 may be of generally conventional type with the exception of the fact that the inner surface of the ring is preferably notched as indicated at 101 and 102 adjoining the split 103 of the ring. In order to prevent the resilient and flexible inner ring 100 from extruding through the split between the ends of the ring 99, an insert 104 is applied, this insert extending into the notches 101 and 102 and the inner surface of the insert following the contour of the ring 100. As is indicated, the ring 99 is beveled as shown at 105 and 106 on opposite sides of the split 103 so that the insert 104 may be pressed securely against the ring and will not be extruded through the necessary slot between the split ends of the ring.

Figure 11 of the drawings shows the insert 104 located in the piston groove 107 in the piston 109. The piston rings necessarily fit loosely enough in the groove 107 so that the rings can adapt themselves to the surface of the cylinder 110. Any fluid under pressure passing by the piston 109 will enter the ring groove 107, expanding the ring 100 and forming a definite seal against the opposite side of the groove and also tending to expand the ring 104 against the surface of the cylinder 110.

The construction illustrated in Figure 10 of the drawings is identical to that illustrated in Figure 9 of the drawings with the exception of the shape of the insert 111 which is employed in place of insert 104. The insert 111 is provided with a rounded under-surface 112 engageable against the expandable ring 100.

The construction shown in Figures 12, 13 and 14 of the drawings is designed to show how the previously designed construction can be applied to valves having valve housings 113 having a plurality of ports such as 114 and 115 entering the valve casing and having a valve stem 116 provided with radially spaced grooves such as 117 which are movable to connect the ports 114 and 115 or to close these ports one from the other. These radial ports 117 are illustrated in Figure 13 of the drawings which is a cross sectional view of Figure 12. As will be seen from Figure 13 of the drawings, either longitudinal movement or rotary movement of the valve stem 116 has a tendency to cut the seals which seal the valve stem 116 with respect to the casing 113.

The seals which are employed at the outer ends of the valve casing 113 are very similar to those illustrated in Figure 1 of the drawings. The valve casing is provided with internal grooves 119 and 120 near opposite ends thereof. A cylindrical ring 121 of Teflon or a similar type of rigid plastic which snugly fits about the valve stem 116 is inserted in each of these grooves 119 and 120. An expandable and contractable ring 122 is interposed in each of these grooves 119 and 120 externally of the rings 121. The arrangement is such that leakage from the ports 114 and 115 past the valve stem 116 has a tendency to exert pressure against these rings 122 to force the sealing rings 121 against the surface of the valve stem.

A third groove 123 is provided intermediate the ports 114 and 115. This groove 123 includes a plurality of rings such as 124 and 125 which closely encircle the valve rod 116. A resilient ring 126 is in the groove 123 externally of the rings 124 and 125 so that when pressure is experienced in the groove 123, the ring 126 will expand against the rings 124 and 125 and press these rings tightly against the surface of the valve rod 116. The plastic ring 124 is on the side of valve stem normally experiencing the highest pressure and the ring 125 which may be of metal or similar material and which is usually harder than the ring 124 will be tightly sealed by the expansion of the outer ring 126 and will prevent the extrusion of the ring 124. The harder ring 125 fits the valve rod so closely that the small leakage past this ring is not sufficient to allow extrusion of the soft ring into the groove as the valve is opened or closed.

The ring 125 is illustrated in Figure 14 of the drawings. This ring is shown as including an arcuate portion 127 which extends substantially more than 180 degrees about the circumference of the valve stem. A removable section 129 of the ring is provided which may be inserted into the groove after the segment 127 is in place and may complete the rings 125.

Figure 15 illustrates a construction similar to a piston ring and shows a ring 130 having a split 131, the ring being expandable to fit into a groove in the valve stem such as 116 if it is not necessary to have the angularly spaced passages 117 therein. This type of ring is also provided with an expansion ring between the ring and the base of the ring groove so that under pressure the split ring will expand against the inner surface of the cylinder in which the valve rod is movable.

While in the foregoing description I have described numerous types of construction which embody the principles of my invention, it should be noticed that all of the constructions have certain features in common. For example, all of the constructions include rings which are of a material relatively hard with respect to resilient rubber or the like and which engage against the relatively slidable surface. These rings are urged into sealing position by the resilient rings and the fluid pressure which are expandable under pressure and as a result the extrusion of these readily expandable rings is prevented and the rings may serve as a sealing means without the wearing or extrusion effect which is usually present in rings of the old type seals. The ability of the rings to expand to follow expansion of the cylinder wall is also of utmost importance in the present invention.

In practice the relatively hard rings such as those shown in Figures 1, 2, 3 and others may be composed of metal or of a plastic such as that known to the trade as DuPont Teflon. Teflon is a tetrafluoroethylene resin. The rings may also be laminated phenolics; and where I have described rings as made of "molded phenolic resin," I desire to have it understood that this term should include laminated phenolics which need not be actually molded in the normal sense.

In accordance with the patent statutes, I have described the principles of construction and operation of my rotary seals and while I have endeavored to set forth the best embodiments thereof, I desire to have it understand that obvious changes may be made within the scope of the following claims without departing from the spirit of my invention.

I claim:

1. A valve seal including a valve cylinder, a valve piston in said cylinder and having a cylindrical surface slidable in said cylinder, axially spaced ports in said cylinder, a groove between said ports in said cylinder wall, a ring of relatively hard material encircling said piston in said groove, a sealing ring of a relatively soft resilient material between said relatively hard material ring and the base of the groove, said pisotn having a longitudinally extending groove therein in said cylindrical surface bridging said rings between said ports in one position of said piston, said first named ring encircling an ungrooved portion of said piston in another position thereof, and a third ring in said groove in side by side relation to said ring of relatively hard material, said third ring being of a material harder than said sealing ring, but softer than said ring of relatively hard material.

2. A pressure seal for use in sealing the space between a first member having a generally cylindrical outer surface and a second member having a bore to accommodate the first member with a running fit, one of the members having a groove therein opening toward the other of said members, said members being subject to relatively higher pressures on one side of said groove and lower pressures on the other side of said groove, a flexible resilient sealing ring within said groove adjoining the base of the groove, a pair of rings of relatively hard material compared to said flexible ring interposed at least partially between said flexible ring and the other of said members, said rings of relatively hard material each being engageable with a corresponding side wall of said groove, one of said relatively hard material rings being of a material harder than the other such ring, the harder of said two rings being disposed on the relatively low pressure side of said groove, whereby pressure entering said groove may expand said flexible resilient ring between the base of the groove and said rings of hard material.

3. The structure described in claim 2 and in which the harder of said two rings is composed of metal and the other of said two rings is composed of plastic.

4. The construction described in claim 2 and in which said pair of rings of relatively hard material are rectangular in cross section.

References Cited in the file of this patent
UNITED STATES PATENTS

| | | |
|---|---|---|
| 2,456,356 | Aber | Dec. 14, 1948 |
| 2,485,504 | Morgan | Oct. 18, 1949 |
| 2,509,672 | Christensen | May 30, 1950 |
| 2,567,527 | Parks | Sept. 11, 1951 |
| 2,739,855 | Bruning | Mar. 27, 1956 |
| 2,784,013 | Groen | Mar. 5, 1957 |

FOREIGN PATENTS

| | | |
|---|---|---|
| 704,117 | Great Britain | Feb. 17, 1954 |
| 862,046 | France | Nov. 22, 1940 |
| 958,598 | France | Sept. 19, 1949 |
| 1,049,256 | France | Aug. 19, 1953 |